(12) United States Patent
Cheng et al.

(10) Patent No.: US 8,607,119 B2
(45) Date of Patent: Dec. 10, 2013

(54) METHOD AND APPARATUS FOR TRANSMITTING AND RECEIVING CONTROL INFORMATION OF MIMO SYSTEM

(75) Inventors: Jinxia Cheng, Suwon-si (KR); Myeong Cheol Shin, Daejeon (KR); Sang Boh Yun, Seongnam-si (KR); Sung Soo Hwang, Yongin-si (KR); Sei Joon Shim, Hwaseong-si (KR); Sung Hwan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 278 days.

(21) Appl. No.: 13/133,782

(22) PCT Filed: Dec. 9, 2009

(86) PCT No.: PCT/KR2009/007364
§ 371 (c)(1),
(2), (4) Date: Aug. 26, 2011

(87) PCT Pub. No.: WO2010/068039
PCT Pub. Date: Jun. 17, 2010

(65) Prior Publication Data
US 2011/0302480 A1    Dec. 8, 2011

(30) Foreign Application Priority Data

Dec. 9, 2008    (KR) .................. 10-2008-0124439

(51) Int. Cl.
*H03M 13/00*    (2006.01)
(52) U.S. Cl.
USPC ........................................ 714/758
(58) Field of Classification Search
USPC .................................. 714/746, 758, 800
See application file for complete search history.

(56) References Cited

U.S. PATENT DOCUMENTS 8,351,530 B2 *    1/2013    Pan et al. ............... 375/267
8,374,109 B2 *    2/2013    Luo et al. ............... 370/310

FOREIGN PATENT DOCUMENTS

KR    10-2008-0010609 A    1/2008
KR    10-2008-0084456 A    9/2008

OTHER PUBLICATIONS

Caire et al, Mutliuser MIMO downlink with limited inter cell cooperation: approximate Interference Alignment in time, frequency and space, Sep. 2008, IEEE, p. 730-737.*
Li et al., Soft Information Combining for Turbo-MIMO Retransmission, 6th International Conference on ITS Telecommunications Proceedings, 2006.

* cited by examiner

*Primary Examiner* — Shelly A Chase
(74) *Attorney, Agent, or Firm* — Jefferson IP Law, LLP

(57) ABSTRACT

The present invention relates to a method and a system for transmitting and receiving control information of an Multi-Input Multi-Output (MIMO) system, wherein the control information consists of information bits and parity bits. A base station transmits the control information including the location information for where the control information of the other terminal is transmitted. A terminal receives the control information of the other terminal based on the location information for where the control information of the other terminal is received. Therefore, the precoding matrix of the other terminal can be obtained from the received control information. The invention enables the removal of interference through the obtained precoding matrix when receiving a data symbol in an environment where a channel is not in a good state.

12 Claims, 7 Drawing Sheets

METHOD AND APPARATUS FOR TRANSMITTING AND RECEIVING CONTROL INFORMATION OF MIMO SYSTEM

BACKGROUND OF THE INVENTION

1. Field of the Invention

The present invention relates to a method and an apparatus for providing control information of a multi-input-multi-output (referred to as "MIMO" hereinafter) system, and more particularly, to a method capable of acquiring control information of another user executing cooperative transmitting and receiving functions of an MIMO system.

2. Description of the Related Art

According to a Long Term Evolution (LTE) specification, a multiuser MIMO (referred to as "MU-MIMO" hereinafter) technology is used as an essential approach to enlarge a downlink throughput of user equipments of a cell-edge.

A procoding vector is used to remove interference between MU-MIMO user equipments using the same frequency in an MU-MIMO system based on a code book storing a Precoding Matrix Index (PMI).

In a 3GPP LTE, a control channel called a Physical Downlink Control Channel (PDCCH) including loaded control information through downlink control information (DCI) is transmitted. At this time, a base station selects a precoding vector from a code book and transmits the selected precoding vector to a user equipment through the DCI of a PDCCH.

However, in a conventional DCI, when there are more user equipments than two performing cooperative communication using the same frequency, one of the user equipments can know its precoding vector but cannot know precoding vectors of other user equipments.

SUMMARY OF THE INVENTION

The present invention has been made in view of the above problems, and provides a method for providing control information enabling a user to know a precoding vector between user equipments using an MU-MIMO, and an apparatus thereof.

The present invention further provides a method for providing control information that allows a user to know a precoding vector between user equipments using an MU-MIMO without converting a format of the control information and changing contents of information bits of control information, and an apparatus thereof.

In accordance with an aspect of the present invention, an apparatus for transmitting control information of a base station in a multi-input-multi-output (MIMO) system, includes: a parity bit processor adding a parity bit to information bits of respective user equipments (UEs) generated according to scheduling of the base station; and a position sequence processor masking a position sequence having location information to which control information of the other UE is transmitted to the parity bit to output control information of the respective UEs.

The apparatus further includes an identification sequence processor masking an identified sequence having identification information for distinguishing respective UEs from each other to the added parity bit.

The position sequence indicates a location to which control information of the other UE performing cooperative communication using the same frequency as that of a UE is transmitted.

In accordance with another aspect of the present invention, an apparatus for receiving control information of a user equipment (UE) in a multi-input-multi-output (MIMO) system, includes: a masking processor receiving control information consisting of an information bit and a parity bit to mask a position sequence having location information to which control information of the other UE is transmitted the parity bit; a Cyclic Redundancy Check (CRC) operator performing a CRC operation for the masked control information; and a detector detecting a precoding vector from the control information of the other UE through a control information location of the other user equipment corresponding the masked position sequence when the CRC operation is succeeded.

The position sequence indicates a location to which control information of the other UE performing cooperative communication using the same frequency as that of the UE is transmitted.

The masking processor masks an identified sequence having identification information for distinguishing respective UEs from each other to added parity bit.

In accordance with another aspect of the present invention, a method for transmitting control information of a base station in a multi-input-multi-output (MIMO) system, includes: adding a parity bit to information bits of respective user equipments (UEs) generated according to scheduling of the base station; masking a position sequence having location information to which control information of the other UE is transmitted to the parity bit to generate control information of the respective UEs; and transmitting the generated control information.

The parity bit masks an identified sequence for distinguishing the respective user equipments from each other.

The position sequence indicates a location to which control information of the other UE using the same frequency as that of a UE is transmitted.

In accordance with another aspect of the present invention, a method for receiving control information of a user equipment in a multi-input-multi-output (MIMO) system, includes: receiving control information consisting of an information bit and a parity bit to mask a position sequence having location information to which control information of the other user equipment is transmitted the parity bit; performing a Cyclic Redundancy Check (CRC) operation for the masked control information; and detecting a precoding vector from the control information of the other user equipment through a control information location of the other user equipment corresponding to the masked position sequence when the CRC operation is succeeded.

The position sequence indicates a location to which control information of the other UE using the same frequency as that of a UE is transmitted.

Masking a position sequence masks an identified sequence having identification information for distinguishing the UE from other UEs together with the position sequence to the added parity bit.

In the present invention as illustrated above, a DCI according to an embodiment of the present invention may provide DCI location information of the other user equipment using the same frequency in an MU-MIMO system such that a user may know a precoding vector value of an interference user equipment. In particular, the DCI according to an embodiment of the present invention does not change a format of a conventional DCI and contents of information bits. Therefore, the present invention does not give a special load to a system and an overhead to a transmission resource of a downlink channel.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
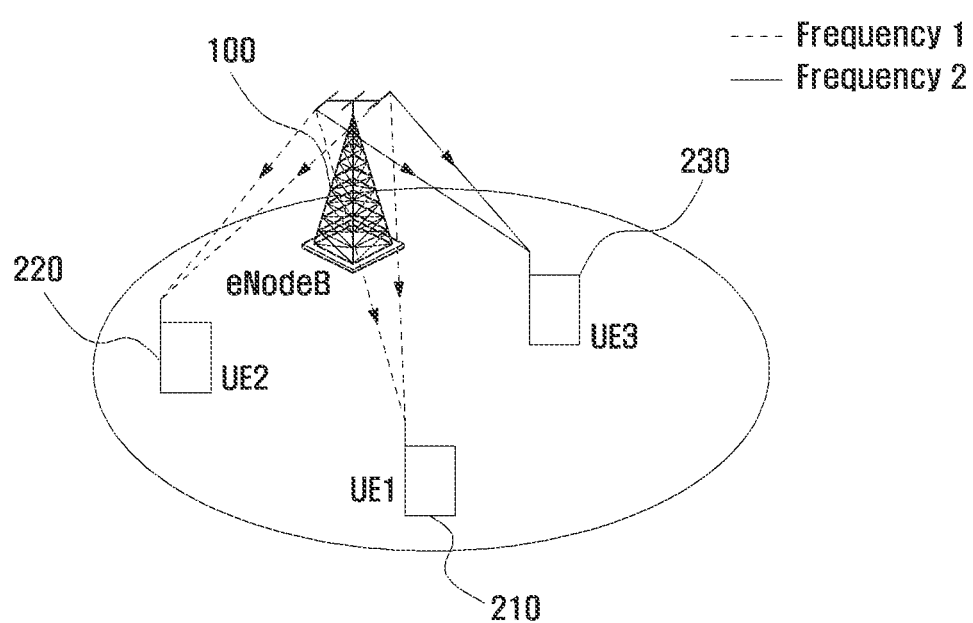
FIG. 1 is a block diagram illustrating a schematic configuration of an MIMO system according to an exemplary embodiment of the present invention.

First, the following is a description of a configuration of an MIMO system according to an embodiment of the present invention. FIG. 1 is a block diagram illustrating a schematic configuration of an MIMO system according to an exemplary embodiment of the present invention.

Referring to FIG. 1, an MIMO system includes a base station (eNodeB) 100 and first to third User Equipments (UEs) 210, 220, and 230. Hereinafter, the reference numeral 200 will be used for common calling a UE.

In an embodiment of the present invention, the eNodeB 100 transmits a signal in an MU-MIMO scheme or a Single User-Multiple Input Multiple Output (SU-MIMO) scheme.

In this case, first and second UEs 110 and 120 communicate using a frequency 1 according to the MU-MIMO scheme. Meanwhile, a third terminal 130 communicates using a frequency 2 according to the SU-MIMO scheme.

Because the first and second UEs 110 and 120 use the same frequency, interference occurs therebetween. Accordingly, to remove the interference and transmit a signal in the MU-MIMO scheme, the eNodeB 100 previously stores respective precoding vectors to be allotted to the first and second UEs 110 and 120 and Precode Matrix Indexes (PMIs) being indexes thereof in a codebook. The eNodeB 100 communicates with the first and second UEs 110 and 120 using a precoding vector selected from the codebook. Minimum interference occurring in respective UEs 210 and 220 is preferably selected as the precoding vector. The eNodeB 100 may transmit Downlink Control Information (DCI) including respective precoding vectors of the UEs 210 and 220.

The following equation 1 expresses a signal received by the first UE 210 from the eNodeB 100.

$$\tilde{x} = W_{Rx} H W_{Tx} x + W_{Rx} n \qquad \text{[Equation 1]}$$

$$= W_{Rx} \left\{ \begin{bmatrix} h_1(w_{Tx}^1 x_1 + w_{Tx}^2 x_2) \\ h_2(w_{Tx}^1 x_1 + w_{Tx}^2 x_2) \end{bmatrix} + n \right\}$$

In the equation 1, $h_i$ is a vector value of an i-th row of a channel matrix of an eNodeB 100 and the first UE 210. An $x_1$ indicates a data symbol, and an i indicates an index of the UE 200. That is, the $x_1$ is the data symbol to be transmitted to the first UE 210, and an $x_2$ is a data symbol to be transmitted to the second UE 120. A $W_{Tx}$ indicates a precoding vector, and an i indicates an index of a UE 200. That is, the $W_{Tx}$ indicates a precoding vector to be applied to the first UE 210. Further, a $W_{Rx}$ indicates a detecting matrix for detecting a data symbol from an MIMO signal.

When detecting a data symbol ($x_i$, namely, $x_1$ or $x_2$) in a Means square (MMSE), the UE 200 may use a detecting matrix according to following equations 2 and 3.

$$W_{Rx} = (Hw_{Tx}^i)^H (HW_{Tx}(HW_{Tx})^H = \sigma_n^2 I)^{-1} \qquad \text{[Equation 2]}$$

$$W_{Rx} = (Hw_{Tx}^i)^H (Hw_{Tx}^i(Hw_{Tx}^i)^H + \sigma_n^2 I)^{-1} \qquad \text{[Equation 3]}$$

Here, a user may know that a precoding vector of a signal transmitted to the other UE by the UE 200 from the equation 2. The user may know only an own precoding vector from the equation 3.

Although the first UE 210 cannot know a precoding vector $W_{Tx}$ of the second UE 200 in a high Signal-to-interference ratio (SINR) environment, it may sufficiently detect its data symbol. Meanwhile, when interference due to the second UE 220 is strong, that is, when the first UE 210 does not know the precoding vector $W_{Tx}$ of the second UE 200 in a low SINR environment, it has a difficulty in detecting its data symbol $x_1$.

Accordingly, in an embodiment of the present invention, to solve such a problem, MU-MIMO terminals transmits control information DCI including location information thereof between the terminals. Consequently, the UE 200 according to an MU-MIMO may acquire its precoding vector from its control information DCI, and simultaneously acquire location information to which control information DCI of an interference UE is transmitted. The UE 200 may receive the control information of the interference UE according to the location information to acquire a precoding vector index of the interference UE.

According to the LTE, the control information DCI is transmitted through a control channel PDCCH, and the control channel PDCCH is loaded and transmitted in first to third OFDM symbols of each subframe in a downlink frame. The control channel may become a PDCCH.

Hereinafter, the control information according to an embodiment of the present invention will be explained. Prior to a description of the control information according to an embodiment of the present invention, general control information is described. The general control information is configured as illustrated in a following equation 4.

$$\begin{cases} c_k = b_k & \text{for } k = 0, 1, \ldots, A-1 \\ c_k = (b_k + x_{UE,k-A}) \bmod 2 & \text{for } k = A, A+1, \ldots, A+L-1 \end{cases} \qquad \text{[Equation 4]}$$

In the equation 4, the general control information DCI is obtained by adding CRC parity bits to a information bit ($c_k=b_k$) and masking a UE identified sequence to the CRC parity bits ($c_k=(b_k+x_{UE,k-A})$).

Figure 2:
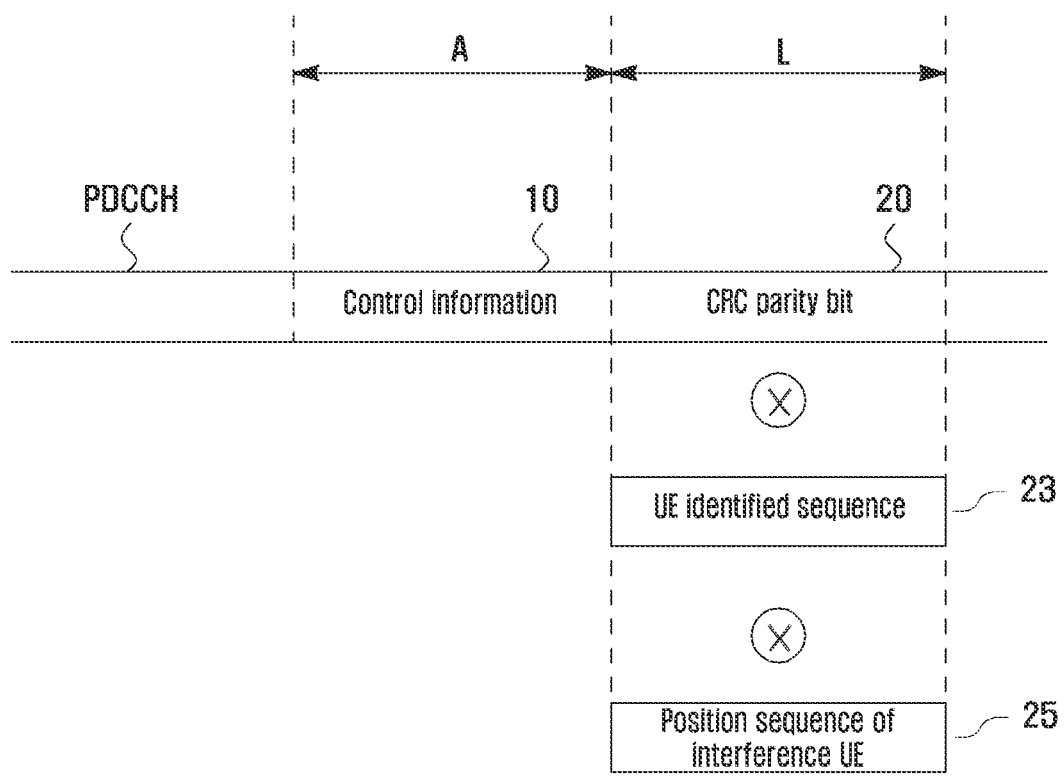
FIG. 2 is a view illustrating control information according to an exemplary embodiment of the present invention.

In the meantime, the control information according to an embodiment of the present invention further contain location information indicating a location to which control information DCI of an interference UE is transmitted. The following is a description of the control information according to an embodiment of the present invention. FIG. 2 is a view illustrating control information according to an exemplary embodiment of the present invention.

Referring to FIG. 2, the control information DCI according to an embodiment of the present invention contains control information 10, CRC parity bits 20, a UE identified sequence 23, and a position sequence 25 of interfering UEs' DCI.

The control bit 10 contains information with respect to a transmission resource including a uplink and a downlink allotted to a corresponding UE and information with respect to a precoding vector. The CRC parity bit 20 is parity information for performing a CRC operation testing presence of error of the information bit. The UE identified sequence 23 is identification information indicating which UE a DCI is, and is masked or scrambled to the CRC parity bit 20. The position sequence 25 is location information indicating a location to which a DCI of an interference UE is transmitted.

That is, as shown, the DCI according to an embodiment of the present invention fundamentally includes an information bit and a parity bit 20. The UE identified sequence 23, and the position sequence 25 are masked to the parity bit 200 by a mod-2 operation.

The control information DCI according to an embodiment of the present invention is configured as illustrated in a following equation 5.

$$\begin{cases} c_k^u = b_k & \text{for } k = 0, 1, \ldots, A-1 \\ c_k^u = (b_k + x_{UE,k-A} + x_{IUDP,k-A}) \bmod 2 & \text{for } k = A, A+1, \ldots, A+L-1 \end{cases}$$ [Equation 5]

In the equation 5, the "$c_k^u=b_k$ (for k=0, 1, ..., A−1)" is an equation indicating the information bit 10. The "$c_k^u=(b_k+x_{UE,k-A}+x_{IUDP,k-A})$ (for k=A, A+1, ..., A+L−1)" is an equation indicating that the UE identified sequence 23 ($x_{UE,k-A}$) and the position sequence 25 ($x_{IUDP,k-A}$) are masked to the parity bit by a mod-2 operation.

Here, referring to FIG. 2, the length k of the information bit 10, namely k=A from the equation 5, and the length k of the parity bit, namely, k=L from the equation 5. Consequently, both the length of the UE identified sequence 23 ($x_{UE,k-A}$) and the length of the position sequence 25 ($x_{IUDP,k-A}$) are L. Accordingly, the position sequence 25 will now be described in detail. Table 1 illustrates a position sequence of an interference UE according to an embodiment of the present invention.

TABLE 1

| | Control information transmission location of interference UE | Position sequence |
|---|---|---|
| | SU-MIMO | <0, 0, 0, 0, 0, 0, 0, 0, 0, 0, 0, 0, 0, 0, 0, 0> |
| MU-MIMO | Front of target UE | <0, 0, 0, 0, 0, 0, 0, 0, 0, 0, 0, 0, 0, 0, 0, 1> |

TABLE 1-continued

| Control information transmission location of interference UE | Position sequence |
|---|---|
| Rear of target UE | <0, 0, 0, 0, 0, 0, 0, 0, 0, 0, 0, 0, 0, 0, 1, 0> |

The table 1 lists a position sequence of an interference UE according to SU-MIMO and MU-MIMO. It is assumed that a parity bit is 16 bits. Further, it is assumed that three UEs are considered, and first and second UEs 210 and 220 form one group of MU-MIMO and a third UE 230 is an UE according to SU-MIMO. For convenience for a description, a UE receiving a DCI according to an embodiment of the present invention refers to a target UE. When the target UE performs cooperative transmission according to MU-MIMO, the other UE performing cooperative transmission with the target UE refers to an interference UE.

Referring to the table 1, when the target UE uses the SU-MIMO, there are no interference UEs. Accordingly, in order to indicate the interference UE, a position sequence of the interference UE is set to <0, 0, 0, 0, 0, 0, 0, 0, 0, 0, 0, 0, 0, 0, 0, 0>.

In a case where the target UE uses the MU-MIMO, if a DCI of the interference UE is transmitted to a front side of the DCI thereof, the position sequence is set to <0, 0, 0, 0, 0, 0, 0, 0, 0, 0, 0, 0, 0, 0, 0, 1> to indicate that the information is transmitted to a front side of the target UE.

Meanwhile, when the target UE uses the MU-MIMO and the DCI of the interference UE is transmitted to a rear side of the DCI thereof, the position sequence is set to <0, 0, 0, 0, 0, 0, 0, 0, 0, 0, 0, 0, 0, 0, 1, 0> to indicate that the information is transmitted to a rear side of the target terminal.

As illustrated above, in a set state of the position sequence, assuming that the target UE is the first UE 210, an output DCI after CRC operation is as follows. That is, when the target terminal uses an SU-MIMO, the control bit is expressed by a following equation 6.

$$C_k^u=(<b_{UE2,1} \ldots b_{UE2,16}>+<x_{UE2,1} \ldots x_{UE2,16}>+ <0000000000000001>) \bmod 2$$ [Equation 6]

Further, in a case where the target UE uses the MU-MIMO, a DCI when a DCI of the interference UE is transmitted to a front side of a DCI of the target UE is expressed by a following equation 7.

$$C_k^u=(<b_{UE1,1} \ldots b_{UE1,16}>+<x_{UE1,1} \ldots x_{UE1,16}>+ <0000000000000010>) \bmod 2$$ [Equation 7]

Meanwhile, in a case where the target UE uses the MU-MIMO, a DCI when a DCI of the interference UE is transmitted to a rear side of a DCI of the target UE is expressed by a following equation 8.

$$C_k^u=(<b_{UE2,1} \ldots b_{UE2,16}>+<x_{UE2,1} \ldots x_{UE2,16}>+ <0000000000000000>) \bmod 2$$ [Equation 8]

In another embodiment of the present invention, the position sequence may be used as information instructing a location of DCI information of a target UE among entire DCIs that the eNodeB 100 transmits to the control channel. In this case, if a location of the DCI of the target UE among the entire DCIs is instructed, a location of the DCI of the interference UE may be recognized corresponding thereto. A following table 2 illustrates a position sequence when a location of a DCI of the target UE among the entire DCIs is instructed.

TABLE 2

| Control information transmission location of interference UE | | Position sequence |
|---|---|---|
| | SU-MIMO | <0, 0, 0, 0, 0, 0, 0, 0, 0, 0, 0, 0, 0, 0, 0, 0> |
| MU-MIMO | First transmission of entire control information | <0, 1, 0, 0, 0, 0, 0, 0, 0, 0, 0, 0, 0, 0, 0, 0> |
| | Second transmission of entire control information | <1, 0, 0, 0, 0, 0, 0, 0, 0, 0, 0, 0, 0, 0, 1, 0> |

Referring to FIG. 2, when the target UE uses an SU-MIMO, there are not interference UEs. Accordingly, to indicate this, the position sequence is set to <0, 0, 0, 0, 0, 0, 0, 0, 0, 0, 0, 0, 0, 0, 0, 0>.

When the target UE uses an MU-MIMO and a DCI of the interference UE is transmitted to a rear side of a DCI of the target UE, the position sequence is set to <0, 1, 0, 0, 0, 0, 0, 0, 0, 0, 0, 0, 0, 0, 0, 0> to indicate that a DCI of the target UE is firstly transmitted. Accordingly, it may be appreciated that the DCI of the interference UE is secondly transmitted.

In the meantime, when the target UE uses the MU-MIMO, and a DCI of the interference UE is transmitted to a front side of the DCI of the target UE, the position sequence is set to <1, 0, 0, 0, 0, 0, 0, 0, 0, 0, 0, 0, 0, 0, 0, 1> to indicate that the DCI of the target UE is secondly transmitted among entire DCI transmissions. Accordingly, it is appreciated that the DCI of the interference UE is transmitted relatively and firstly.

In the two embodiments, a bit "1" may be used to identify respective sequences, may sequentially be input from a rear side as illustrated in table 1 or from a front side as illustrated in table 2 regardless of the sequence length.

In an embodiment with reference to the table 2, when two UEs communicate according to the MU-MIMO perform communication, two types of position sequence were described. However, this can be enlarged. A following table 3 illustrates a case where three UEs perform cooperative transmission according to the MU-MIMO.

TABLE 3

| Control information transmission location of target UE | | Position sequence |
|---|---|---|
| | SU-MIMO | <0, 0, 0, 0, 0, 0, 0, 0, 0, 0, 0, 0, 0, 0, 0> |
| MU-MIMO | First transmission of entire control information | <0, 1, 0, 0, 0, 0, 0, 0, 0, 0, 0, 0, 0, 0, 0> |
| | Second transmission of entire control information | <1, 0, 0, 0, 0, 0, 0, 0, 0, 0, 0, 0, 0, 0, 0> |
| | Third transmission of entire control information | <1, 1, 0, 0, 0, 0, 0, 0, 0, 0, 0, 0, 0, 0, 0> |

Table 3 assumes that three UEs communicate with each other according to MU-MIMO. Referring to table 3, when a target UE uses an SU-MIMO, because there are no interference UEs, a position sequence is set to <0, 0, 0, 0, 0, 0, 0, 0, 0, 0, 0, 0, 0, 0, 0> to indicate the fact.

When three UEs perform cooperative transmission according to an MU-MIMO, a target UE uses the MU-MIMO. When a DCI of the target UE is transmitted to a first location, the position sequence is set to <0, 1, 0, 0, 0, 0, 0, 0, 0, 0, 0, 0, 0, 0, 0>. Accordingly, the DCI of the interference UE is secondly and thirdly transmitted relatively.

Meanwhile, when the target UE uses an MU-MIMO and a DCI of the target UE is transmitted to a second location, the position sequence is set to <1, 0, 0, 0, 0, 0, 0, 0, 0, 0, 0, 0, 0, 0, 0>. Accordingly, it may be appreciated that the DCI of the interference UE is firstly and thirdly transmitted.

Furthermore, when the target UE uses an MU-MIMO and a DCI of the target UE is transmitted to a third location, the position sequence is set to <1, 1, 0, 0, 0, 0, 0, 0, 0, 0, 0, 0, 0, 0, 0>. Accordingly, it is appreciated that the DCI of the interference UE is firstly and secondly transmitted.

As illustrated previously, the generated DCI is transmitted through a control channel, and each UE 200 decodes its DCI, and extracts resource allotment information and a precoding vector from the DCI to perform communication through allotted transmission resource. Further, each UE 200 detects a data symbol to be transmitted using a precoding vector. In addition, each UE 200 acquires control information of an interference using a position sequence and removes interference using the acquired precoding vector.

Figure 3:
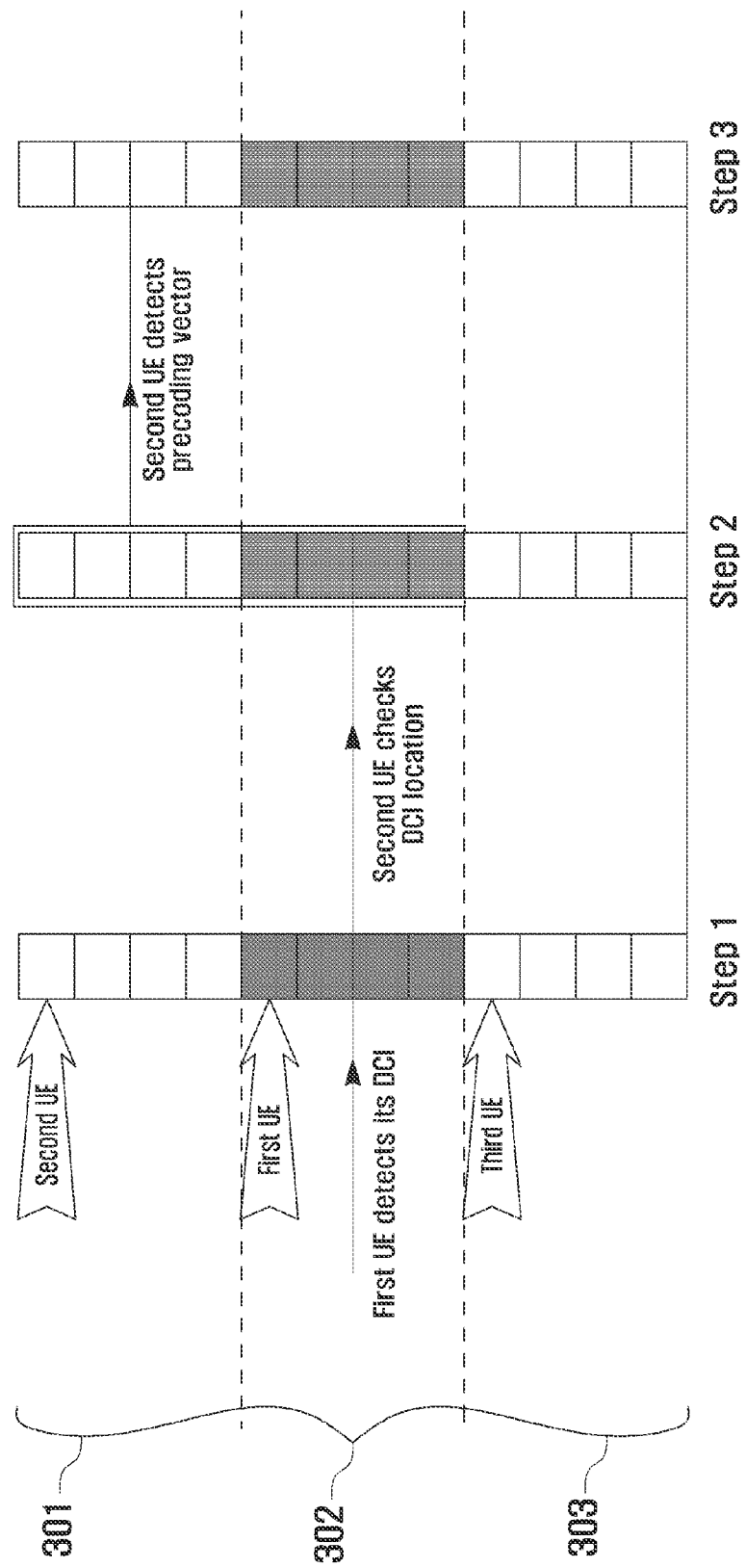
FIG. 3 is a view illustrating a method for detecting control information according to an exemplary embodiment of the present invention.

The following is a description of a method for detecting control information according to an exemplary embodiment of the present invention. FIG. 3 is a view illustrating a method for detecting control information according to an exemplary embodiment of the present invention.

As shown, a procedure for extracting control information by a target UE when cooperative transmission is performed according to an MU-MIMO is described as three steps.

First, it is assumed that an eNodeB 100 transmits DCIs with respect to three UEs through a control channel. Here, two DCIs are transmitted to one UE, and two DCIs consist of 4 Control Channel Elements (CCEs), It is assumed that reference numeral 301 is a DCI of a second UE 220, reference numeral 302 is a DCI of a first UE 210, and reference numeral 303 is a DCI of a third UE 203.

It is assumed that the first and second UEs 210 and 220 perform cooperative transmission according to the MU-MIMO, and a third UE 239 independently performs communication according to an SU-MIMO.

As illustrated above, in an embodiment of the present invention, when transmitting a DCI, a first UE 210 may perform a CRC operation masking its identified sequence to detect its DCI at step 1. Further, the first UE may check a DCI location of an interference UE (second UE) through a CRC operation masking a position sequence at step 2. Accordingly, the first UE may detect the DCI of the interference UE and a precoding vector index of the interference UE (second UE) through a DCI location of the interference UE at step 3.

The CRC operation of an UE is achieved by masking its identified sequence and position sequence to a parity bit of the received DCI. If the CRC operation result is succeeded, it may be checked that a corresponding DCI is a DCI of the UE.

As illustrated previously, in an embodiment of the present invention, a UE transmits a DCI including a position sequence with location information to an interference UE. A DCI transmitter generating the DCI will be described.

Figure 4:
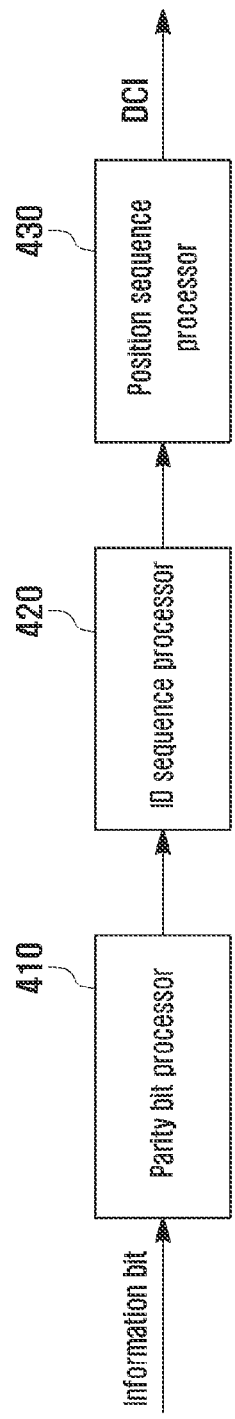
FIG. 4 is a block diagram illustrating an apparatus for transmitting control information according to an exemplary embodiment of the present invention.

FIG. 4 is a block diagram illustrating an apparatus for transmitting control information according to an exemplary embodiment of the present invention.

Referring to FIG. 4, a control information transmitter according to an embodiment of the present invention includes a parity bit processor 410, an identification sequence processor 420, and a position sequence processor 430.

Referring to FIG. 2, the parity bit processor 410 adds a parity bit 20 to information bits 10 of respective UEs.

The identification sequence processor 420 scrambles an UE identified sequence 23 to the parity bit 20. The UE identified sequence may include a "C-RNTI".

The position sequence processor 430 masks a position sequence 25 to the parity bit 20 to finally generate a DCI according to an embodiment of the present invention.

As illustrated previously, the position sequence 25 has DCI location information of the other UE among at least two UEs performing cooperative communication with an eNodeB using the same frequency according to an MU-MIMO. Accordingly, in a case of the MU-MIMO, the position sequence processor 430 masks a suitable position sequence 25 to the parity bit 20 according to a location of another UE performing cooperative communication. In the meantime, in a case of an SU-MIMO, the position sequence processor 430 masks a sequence distinguished from that of the UE using the MU-MIMO to the parity bit.

Figure 5:
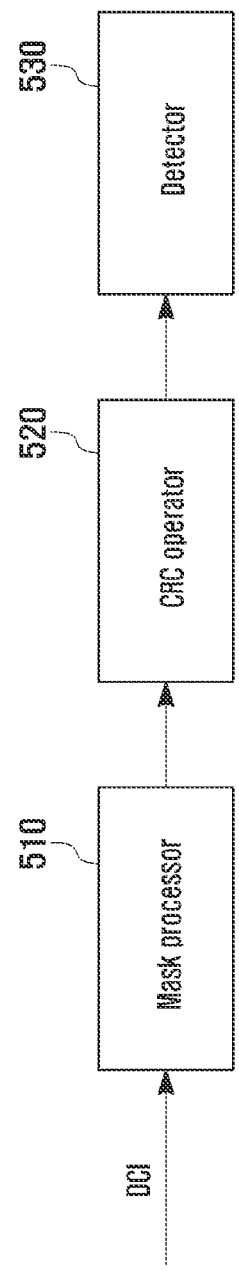
FIG. 5 is a block diagram illustrating an apparatus for receiving control information of a user equipment according to an exemplary embodiment of the present invention.

Hereinafter, an apparatus for receiving control information of an UE according to an embodiment of the present invention will be described. FIG. 5 is a block diagram illustrating an apparatus for receiving control information of a UE according to an exemplary embodiment of the present invention.

Referring to FIG. 5, the apparatus for receiving control information of a UE according to an exemplary embodiment of the present invention includes a masking processor 510, a CRC operator 520, and a detector 530.

The masking processor 510 masks its identified sequence and position sequence to a received parity bit of control information.

The CRP operator 520 performs and outputs a CRC operation for the DCI masking the identified sequence and the position sequence. When the CRC operation is succeeded, the CRC operator 520 outputs this.

The detector 530 detects its transmission resource information and precoding vector from a DCI succeeding the CRC operation, and detects a precoding vector of an interference UE according to location information of the interference UE corresponding to the masked position sequence of the interference UE.

Figure 6:
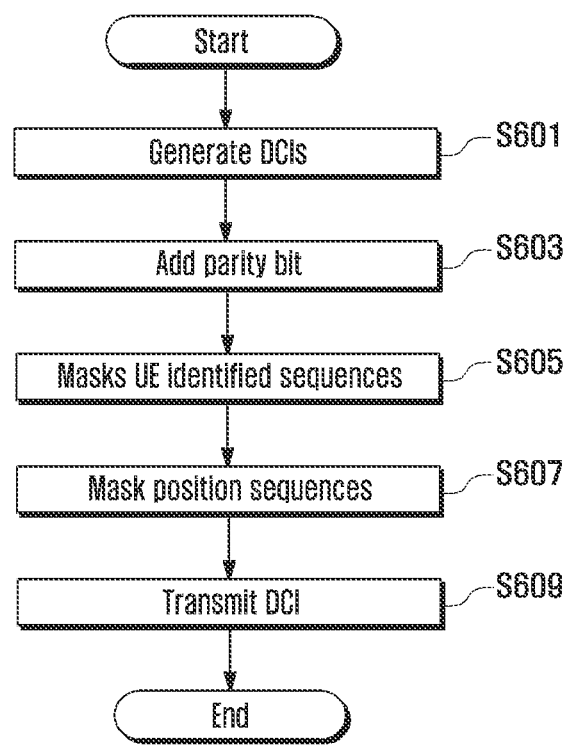
FIG. 6 is a flowchart illustrating a method for transmitting control information according to an exemplary embodiment of the present invention.

The following is an explanation of a method for transmitting a downlink control information according to an exemplary embodiment of the present invention. FIG. 6 is a flowchart illustrating a method for transmitting a downlink control information according to an exemplary embodiment of the present invention.

An eNodeB 100 generates DCIs of all UEs 200 (S601). That is, the eNodeB 100 generates DCIs of all UEs 200 registered therein through scheduling.

Next, the eNodeB 100 adds a parity bit to respective information bits of DCIs of all the registered UEs 200 (S603).

The eNodeB 100 masks UE identified sequences according to respective UEs to parity bits of DCIs of respective UEs (S605).

Next, the eNodeB 100 masks position sequences according to respective UEs to CRC parity bits of DCIs of respective UE (S607).

As illustrated above, the eNodeB 200 masks the UE identification and a position sequence to a CRC parity bit, which is performed by a mod-2 operation. S605 and S607 may be performed at one time.

Subsequently, the eNodeB 100 transmit the generated DCIs through a control channel PDCCH (609).

Figure 7:
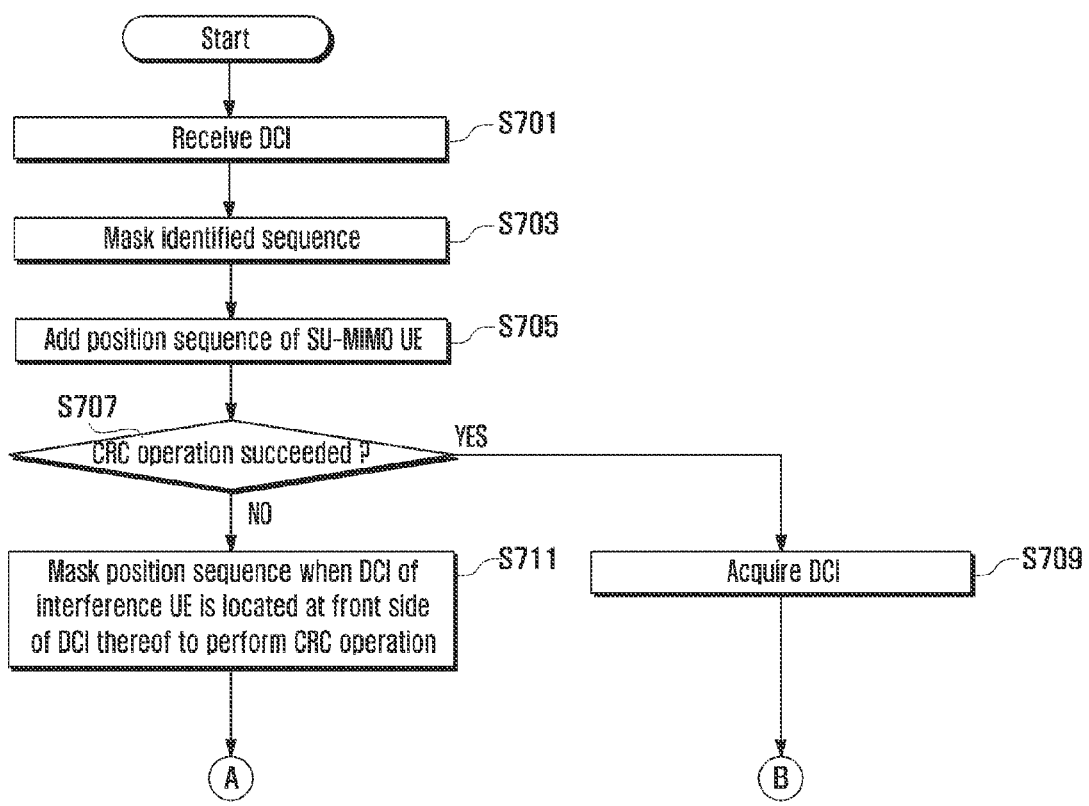
FIG. 7 and FIG. 8 are a flowchart illustrating a method for receiving control information according to an exemplary embodiment of the present invention.
Figure 8:
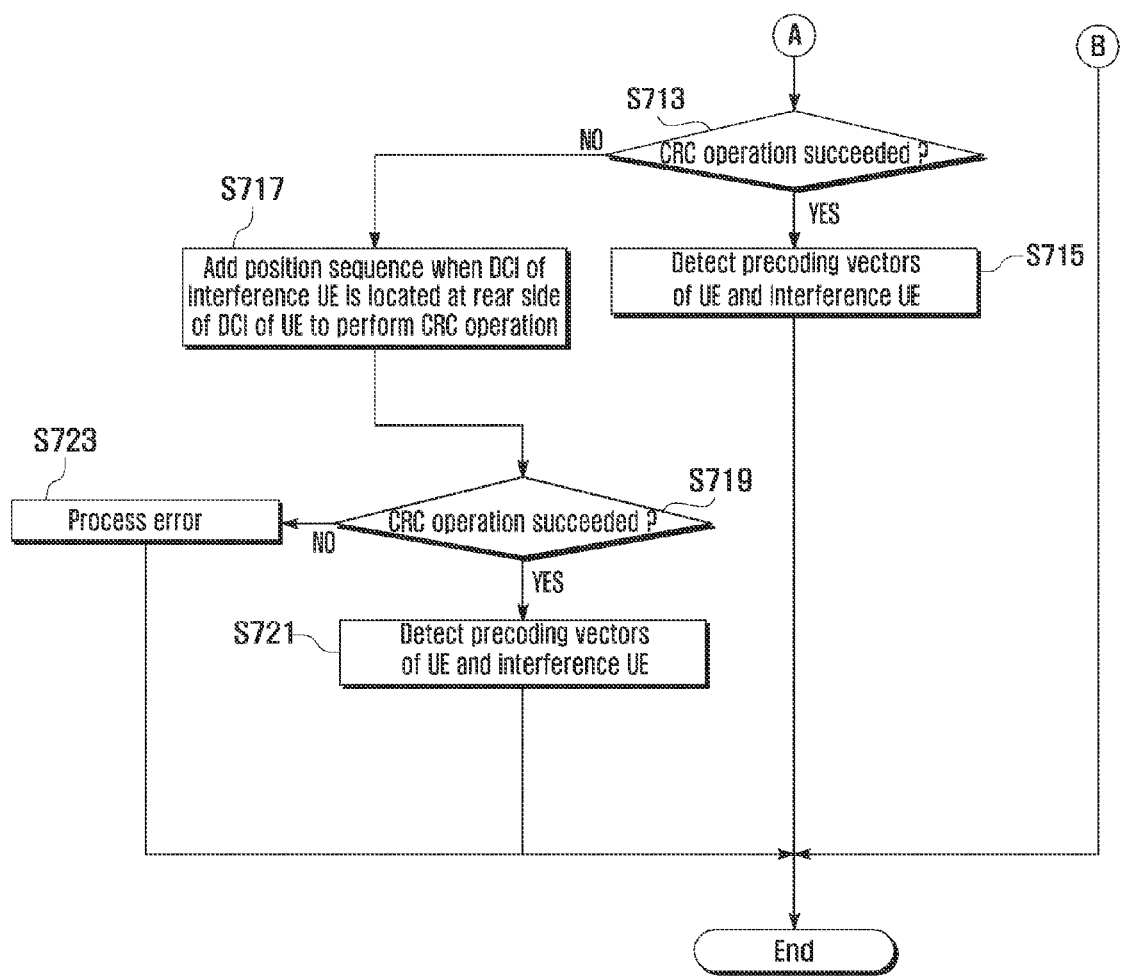

Hereinafter, a method for receiving control information according to an exemplary embodiment of the present invention will be explained. FIG. 7 and FIG. 8 are a flowchart illustrating a method for receiving control information according to an exemplary embodiment of the present invention.

Referring to FIG. 7 and FIG. 8, a UE 200 receives control information DCI through a control channel (S701). Next, the UE 200 masks its identified sequence to a parity bit (S703).

Subsequently, the UE 200 adds a position sequence of an SU-MIMO UE to perform a mod-2 operation (S705). That is, the UE 200 performs a CRC operation. If a CRC operation is succeeded at S707, the UE 200 may acquire its DCI and precoding vector according thereto (S709).

Conversely, if the CRC operation fails at S707, the UE 200 masks a position sequence when a DCI of an interference UE is located at a front side of the DCI thereof to perform the CRC operation (S711). That is, the UE 200 performs the CRC operation.

As the operation result, if the CRC operation is succeeded at S713, it may be appreciated that a signal received through the control channel is a DCI of the UE 200, and a DCI of the interference UE is located at a front side of the DCI of the UE 200. Consequently, since the UE 200 may acquire its DCI and a DCI of an interference UE located at a front side of its DCI, it may detect its precoding vector and a precoding vector of the interference UE (S715).

Conversely, if the CRC operation fails at S713, the UE 200 adds a position sequence when a DCI of the interference UE is located at a rear side of the DCI of the UE 200 to perform a CRC operation (S717). That is, the UE 200 performs the CRC operation. As the CRC operation result, if the CRC operation is succeeded at S719, it may be appreciated that a signal received through the control channel is a DCI of the UE 200, and a DCI of the interference UE is located at a rear side of the DCI of the UE. Accordingly, since the UE 200 may acquire its DCI and a DCI of the interference UE is located at a rear side of its DCI, it may detect its precoding vector and a precoding vector of the interference UE (S721).

Conversely, if the CRC operation fails at S719, because a signal received by the UE 200 through a PDCCH is not its DCI or a DCI having an error, it processes the error (S723).

As is seen from the forgoing description, a DCI according to an embodiment of the present invention provides DCI location information of another UE using the same frequency in an MU-MIMO system to enable a user to know a precoding vector of an interference UE. Accordingly, when receiving a data symbol in an environment where a channel is not in a good state, the present invention enables the removal of interference. In particular, a DCI according to an embodiment of the present invention dos not change a format of a conventional DCI and contents of information bits. Therefore, the present invention does not give a special load to a system and overhead to a transmission resource of a downlink channel.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for transmitting control information of a base station in a multi-input-multi-output (MIMO) system, comprising:
   a parity bit processor adding a parity bit to information bits of respective user equipments (UEs) generated according to scheduling of the base station; and
   a position sequence processor masking a position sequence having location information to which control information of the other UE is transmitted to the parity bit to output control information of the respective UEs.

2. The apparatus of claim 1, wherein the position sequence indicates a location to which control information of the other UE performing cooperative communication using the same frequency as that of a UE is transmitted.

3. The apparatus of claim 1, further comprising an identification sequence processor masking an identified sequence having identification information for distinguishing respective UEs from each other to the added parity bit.

4. An apparatus for receiving control information of a user equipment (UE) in a multi-input-multi-output (MIMO) system, comprising:
   a masking processor receiving control information consisting of an information bit and a parity bit to mask a position sequence having location information to which control information of the other UE is transmitted the parity bit;
   a Cyclic Redundancy Check (CRC) operator performing a CRC operation for the masked control information; and
   a detector detecting a precoding vector from the control information of the other UE through a control information location of the other user equipment corresponding the masked position sequence when the CRC operation is succeeded.

5. The apparatus of claim 4, wherein the position sequence indicates a location to which control information of the other UE performing cooperative communication using the same frequency as that of the UE is transmitted.

6. The apparatus of claim 4, wherein the masking processor masks an identified sequence having identification information for distinguishing respective UEs from each other to added parity bit.

7. A method for transmitting control information of a base station in a multi-input-multi-output (MIMO) system, comprising:
   adding a parity bit to information bits of respective user equipments (UEs) generated according to scheduling of the base station;
   masking a position sequence having location information to which control information of the other UE is transmitted to the parity bit to generate control information of the respective UEs; and
   transmitting the generated control information.

8. The method of claim 7, wherein the parity bit masks an identified sequence for distinguishing the respective user equipments from each other.

9. The method of claim 7, wherein the position sequence indicates a location to which control information of the other UE using the same frequency as that of a UE is transmitted.

10. A method for receiving control information of a user equipment in a multi-input-multi-output (MIMO) system, comprising:
    receiving control information consisting of an information bit and a parity bit to mask a position sequence having location information to which control information of the other user equipment is transmitted the parity bit;
    performing a Cyclic Redundancy Check (CRC) operation for the masked control information; and
    detecting a precoding vector from the control information of the other user equipment through a control information location of the other user equipment corresponding to the masked position sequence when the CRC operation is succeeded.

11. The method of claim 10, wherein the position sequence indicates a location to which control information of the other UE using the same frequency as that of a UE is transmitted.

12. The method of claim 10, wherein masking a position sequence comprises masking an identified sequence having identification information for distinguishing the UE from other UEs together with the position sequence to the added parity bit.

* * * * *